US011558910B2

(12) United States Patent
Lee et al.

(10) Patent No.: US 11,558,910 B2
(45) Date of Patent: Jan. 17, 2023

(54) APPARATUS AND METHOD FOR PROVIDING INTERWORKING OF NETWORK SLICES IN WIRELESS COMMUNICATION SYSTEM

(71) Applicant: Samsung Electronics Co., Ltd., Suwon-si (KR)

(72) Inventors: Hoyeon Lee, Suwon-si (KR); Sangsoo Jeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 177 days.

(21) Appl. No.: 17/096,113

(22) Filed: Nov. 12, 2020

(65) Prior Publication Data

US 2021/0153268 A1 May 20, 2021

(30) Foreign Application Priority Data

Nov. 14, 2019 (KR) .......................... 10-2019-0145983

(51) Int. Cl.
*H04W 76/11* (2018.01)
*H04W 8/20* (2009.01)
(Continued)

(52) U.S. Cl.
CPC .............. *H04W 76/11* (2018.02); *H04W 8/20* (2013.01); *H04W 12/06* (2013.01); *H04W 48/18* (2013.01); *H04W 84/12* (2013.01)

(58) Field of Classification Search
CPC ....... H04W 76/11; H04W 8/20; H04W 12/06; H04W 48/18; H04W 84/12; H04W 88/18; H04W 76/10; H04W 80/10; H04W 92/02
See application file for complete search history.

(56) References Cited

U.S. PATENT DOCUMENTS

2019/0124561 A1  4/2019  Faccin et al.
2020/0162919 A1* 5/2020  Velev ................ H04W 12/084
(Continued)

FOREIGN PATENT DOCUMENTS

WO  2019/074415 A1  4/2019
WO  2019/076244 A1  4/2019
WO  2019/145036 A1  8/2019

OTHER PUBLICATIONS

3GPP TS 29.503 Version 15.4.0 Release 15, 5G; 5G System; Unified Data Management Services; Stage 3 (Jul. 2019), pp. 19, 29, 78, 98, 173 (Year: 2019).*

(Continued)

*Primary Examiner* — Brandon J Miller
(74) *Attorney, Agent, or Firm* — Jefferson IP Law, LLP

(57) ABSTRACT

A method of selecting, by a control entity, a network slice is provided. The method includes receiving a create session request message from a Serving Gateway (S-GW) in response to a Packet Data Network (PDN) connectivity request message transmitted by a terminal, transmitting, to a storage entity, a request message for subscriber information including identification information of the terminal, receiving, from the storage entity, subscription data of the terminal corresponding to the identification information of the terminal, selecting at least one network slice based on the subscription data of the terminal and slice information supportable by the control entity, and transmitting a create session response message including information of the selected at least one network slice, wherein the subscription data of the terminal includes information about a subscribed network slice of the terminal and information regarding whether the subscribed network slice of the terminal is supported in an Evolved Packet Core (EPC).

11 Claims, 7 Drawing Sheets

(51) Int. Cl.
  *H04W 12/06* (2021.01)
  *H04W 48/18* (2009.01)
  *H04W 84/12* (2009.01)

(56) References Cited

U.S. PATENT DOCUMENTS

2020/0245209 A1* 7/2020 Patil ..................... H04W 76/12
2020/0260340 A1  8/2020 Jing et al.

OTHER PUBLICATIONS

Ericsson, DraftCR—Proposed flow for clarifying primary authentication steps, 3GPP TSG-SA WG3 Meeting #97, S3-194214, Nov. 11, 2019, Reno (US).

Nec, "S-NSSAI not available in the current PLMN" when non NSSAA supported UE requesting the S-NSSAI subjects to NSSAA, 3GPP TSG-CT WG1 Meeting #120, C1-197004, Oct. 11, 2019, Portoroz (Slovenia).

Nokia et al., Correcting AMF behaviour for Service Request that is not integrity protected, SA WG2 Meeting #132, S2-1903668, May 29, 2019, Xi'an, PRC.

3rd Generation Partnership Project; Technical Specification Group Services and System Aspects; General Packet Radio Service (GPRS) enhancements for Evolved Universal Terrestrial Radio Access Network (E-UTRAN) access (Release 16), 3GPP TS 23.401, V16.2.0, Mar. 25, 2019.

Ericsson, NSSAA at mobility, 3GPP TSG-SA WG2 Meeting #136, S2-1911792, Nov. 8, 2019, Reno, USA.

Samsung, PDN connection establishment and NSSAA, 3GPP TSG-CT WG1 Meeting #122-e, Electronic meeting, C1-200575, Feb. 17, 2020.

International Search Report dated Feb. 16, 2021, issued in International Application No. PCT/KR2020/015798.

European Search Report dated Apr. 28, 2021, issued in European Application No. 20207387.0.

* cited by examiner

APPARATUS AND METHOD FOR PROVIDING INTERWORKING OF NETWORK SLICES IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0145983, filed on Nov. 14, 2019, in the Korean Intellectual Property Office, the disclosure of which is incorporated by reference herein in its entirety.

BACKGROUND

1. Field

The disclosure relates to a wireless communication system. More particularly, the disclosure relates to a method for providing network slicing in a wireless communication system.

2. Description of Related Art

To meet the increase in demand with respect to wireless data traffic after the commercialization of 4th generation (4G) communication systems, considerable efforts have been made to develop pre-5th generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (massive MIMO), full dimensional MIMO (FD-MIMO), array antennas, analog beamforming, and large-scale antennas. In order to improve system networks for 5G communication systems, various technologies have been developed, e.g., evolved small cells, advanced small cells, cloud radio access networks (Cloud-RAN), ultra-dense networks, device-to-device (D2D) communication, wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high-quality medical services, etc.

Various attempts are being made to apply 5G communication systems to the IoT network. For example, technologies related to sensor networks, M2M communication, MTC, etc., are being implemented using 5G communication technology including beamforming, MIMO, array antennas, etc. The application of Cloud-RAN as a big data processing technology described above may be an example of the convergence of 5G communication technology and IoT technology.

As described above, various services may be provided due to the development of wireless communication systems, and thus, there is a need for methods of effectively providing such services, and in particular, various methods for efficiently providing network slicing.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for interworking between a 5th Generation (5G) network system architecture providing a network slicing function and an evolved packet system (EPS) network.

Additional aspects will be set forth in part in the description which follows and, in part, will be apparent from the description, or may be learned by practice of the presented embodiments.

In accordance with an aspect of the disclosure, a method of selecting, by a control entity, a network slice is provided. The method of selecting includes receiving a create session request message from a Serving Gateway (S-GW) in response to a Packet Data Network (PDN) connectivity request message transmitted by a terminal, transmitting, to a storage entity, a request message for subscriber information including identification information of the terminal, receiving, from the storage entity, subscription data of the terminal corresponding to the identification information of the terminal, selecting at least one network slice based on the subscription data of the terminal and slice information supportable by the control entity, and transmitting a create session response message including information of the selected at least one network slice, wherein the subscription data of the terminal includes information about a subscribed network slice of the terminal and information regarding whether the subscribed network slice of the terminal is supported in an Evolved Packet Core (EPC).

The information regarding whether the subscribed network slice of the terminal is supported in an EPC may include information indicating whether the subscribed network slice of the terminal is subject to Network Slice-Specific Authentication and Authorization (NSSAA).

The selecting may include selecting, from among subscribed network slices of the terminal, a network slice that is not subject to NSSAA and is supportable by the control entity.

The PDN connectivity request message may include information of an Access Point Name (APN) requested from the terminal, wherein the selecting includes selecting, from among subscribed network slices of the terminal, a network slice that is not subject to NSSAA, supports the APN, and is supportable by the control entity.

When there is no network slice selectable by the control entity, the PDN connectivity request may be rejected.

A case where there is no network slice selectable by the control entity may include a case where network slices that are supportable by the control entity from among subscribed network slices of the terminal are all subject to NSSAA.

The control entity may be a combo-node of a Session Management Function (SMF) and a PDN Gateway control (PGW-C), and the storage entity may be a combo-node of a Home Subscriber Server (HSS) and a Unified Data Management (UDM).

In accordance with another aspect of the disclosure, a method of supporting, by a storage entity, selection of a network slice is provided. The method of supporting includes receiving, from a control entity, a request message for subscriber information including identification information of a terminal, and transmitting, to the control entity, subscription data of a terminal corresponding to the identification information of the terminal, wherein the subscription data of the terminal includes information about a subscribed network slice of the terminal and information regarding whether the subscribed network slice of the terminal is supported in an EPC.

The information regarding whether the subscribed network slice of the terminal is supported in an EPC may include information indicating whether the subscribed network slice of the terminal is subject to NSSAA.

The control entity may be a combo-node of a SMF and a PGW-C, and the storage entity may be a combo-node of an HSS and a UDM.

In accordance with another aspect of the disclosure, a control entity for selecting a network slice is provided. The control entity for selecting a network slice includes a transceiver, and a processor coupled with the transceiver and configured to: receive a create session request message from a S-GW in response to a PDN connectivity request message transmitted by a terminal, transmit, to a storage entity, a request message for subscriber information including identification information of the terminal, receive, from the storage entity, subscription data of a terminal corresponding to the identification information of the terminal, select at least network slice based on the subscription data of the terminal and slice information supportable by the control entity, and transmit a create session response message including information of the selected at least one network slice, wherein the subscription data of the terminal includes information about a subscribed network slice of the terminal and information regarding whether the subscribed network slice of the terminal is supported in an EPC.

The information regarding whether the subscribed network slice of the terminal is supported in an EPC may include information indicating whether the subscribed network slice of the terminal is subject to NSSAA.

The processor may be further configured to select, from among subscribed network slices of the terminal, a network slice that is not subject to NSSAA and is supportable by the control entity.

The PDN connectivity request message may include information of an APN requested from the terminal, wherein the processor is further configured to select, from among the subscribed network slices of the terminal, a network slice that is not subject to NSSAA, supports the APN, and is supportable by the control entity.

The processor may be further configured to reject the PDN connectivity request when there is no network slice selectable by the control entity.

A case where there is no network slice selectable by the control entity may include a case where network slices that are supportable by the control entity from among subscribed network slices of the terminal are all subject to NSSAA.

The control entity may be a combo-node of a SMF and a PGW-C, and the storage entity may be a combo-node of an HSS and a UDM.

In accordance with another aspect of the disclosure, a storage entity for supporting selection of a network slice is provided. The storage entity for supporting selection of a network slice includes a transceiver, and a processor coupled with the transceiver and configured to: receive, from a control entity, a request message for subscriber information including identification information of the terminal, and transmit, to the control entity, subscription data of a terminal corresponding to the identification information of the terminal, wherein the subscription data of the terminal includes information about a subscribed network slice of the terminal and information regarding whether the subscribed network slice of the terminal is supported in an EPC.

The information regarding whether the subscribed network slice of the terminal is supported in an EPC may include information indicating whether the subscribed network slice of the terminal is subject to NSSAA.

The control entity may be a combo-node of a SMF and a PGW-C, a SMF or a PGW-C, and the storage entity may be a combo-node of an HSS and a UDM, a UDM or an HSS.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
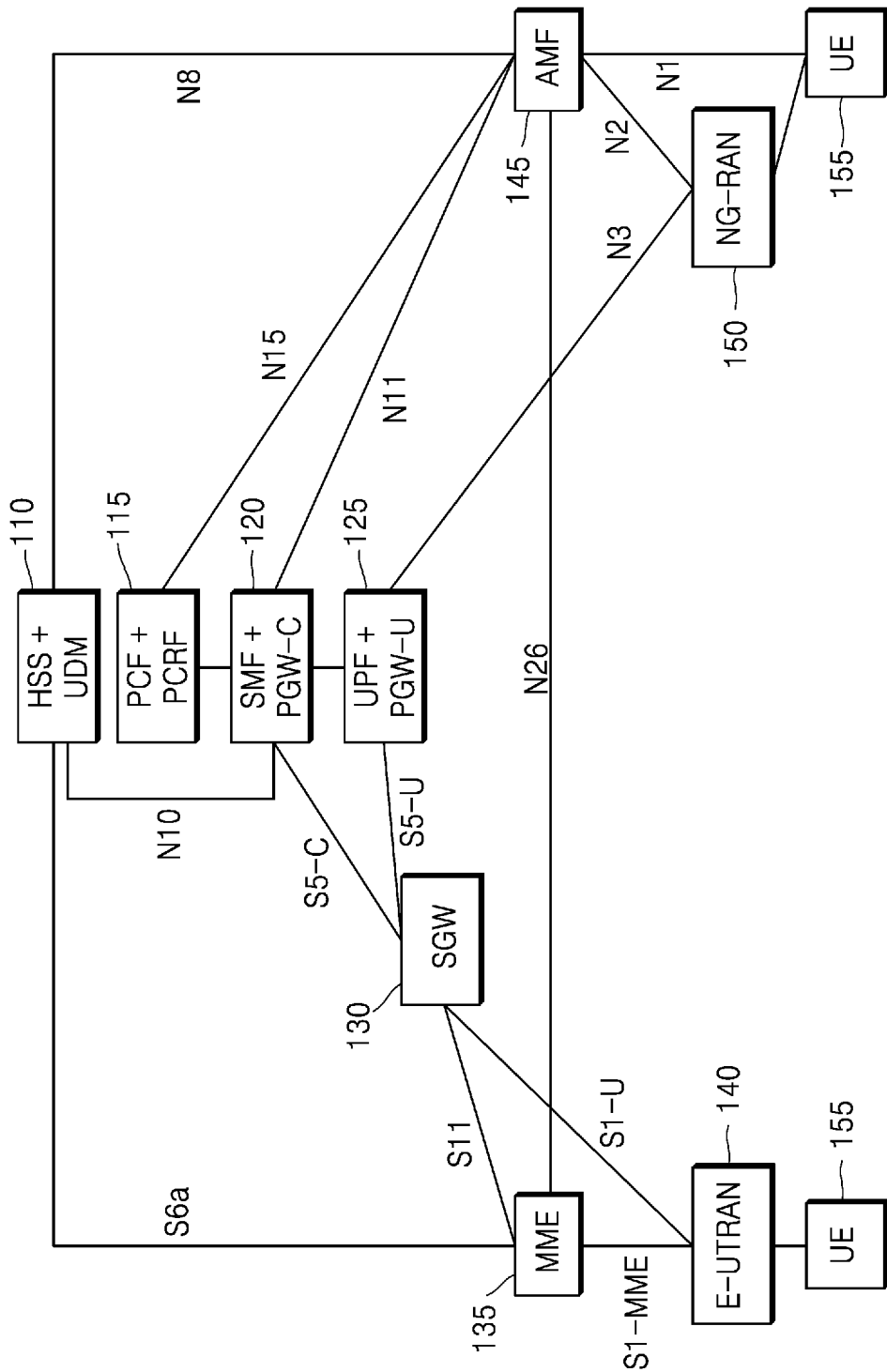
FIG. 1 is a diagram of an interworking scheme between a 5th Generation system (5GS) and an evolved packet system (EPS) under a non-roaming condition according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-executable or computer-readable memory that may direct a computer or other programmable data processing equipment to function in a particular manner, such that the instructions stored in the computer-executable or computer-readable memory produce a manufactured article including instruction means that perform the functions specified in the flowchart block(s). The computer program instructions may also be loaded onto a computer or other programmable data processing equipment to cause a series of operations to be performed on the computer or other programmable data processing equipment to produce a computer-executable process such that the instructions that are executed on the computer or other programmable data processing equipment provide operations for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term "unit" or '~er(or)' used herein denotes a software element or a hardware element such as a field-programmable gate array (FPGA) or an application-specific integrated circuit (ASIC), and performs a certain function. However, the term 'unit' or '~er(or)' is not limited to software or hardware. The term 'unit' or '~er(or)' may be configured to be included in an addressable storage medium or to reproduce one or more processors. Thus, the term 'unit' or '~er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or '~ers(ors)' may be combined into a smaller number of components and 'units' or '~ers(ors)' or may be further separated into additional components and 'units' or '~ers(ors)'. In addition, the components and 'units' or '~ers(ors)' may be implemented to operate one or more central processing units (CPUs) in a device or a secure multimedia card.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, a base station is an entity that assigns resources of a terminal, and may be at least one of a node B (NB), a base station (BS), an evolved node B (eNB), a next generation node B (gNB), a wireless access unit, a base station controller, or a node on a network. The embodiments of the disclosure may be applied to other communication systems having similar technical backgrounds and channel configurations to the embodiments of the disclosure. Furthermore, it should be understood by those skilled in the art that the embodiments of the disclosure are applicable to other communication systems though modifications not departing from the scope of the disclosure.

The term for identifying an access node, the term referring to a network entity or a network function (NF), the term referring to messages, the term referring to an interface between network objects, the term referring to various identification information, and the like, are exemplified for convenience of description. However, the disclosure is not limited by the following terms, and other terms having equivalent technical meanings may be used.

The disclosure relates to an apparatus and method for providing interworking of network slices in a wireless communication system. More specifically, the disclosure presents a description of a technique of interworking between a 5th Generation (5G) network system architecture, which provides a network slicing function in a wireless communication system, and an Evolved Packet System (EPS) network system.

As used below, a term indicating a signal, a term indicating a channel, a term indicating control information, a term indicating network entities, a term indicating a component of an apparatus, etc., will be presented for convenience of description. However, the disclosure is not limited by the following terms, and other terms having equivalent technical meanings may be used.

Although the disclosure will be described with reference to various embodiments thereof by using terms used in some communication standards (e.g., the 3$^{rd}$ Generation Partnership Project: 3GPP), those are merely examples used for description. Various embodiments of the disclosure may be easily modified for application to other communication systems.

In the 3GPP standards, the 5G network system architecture and procedures are standardized. Mobile carriers may provide various services on a 5G network. To provide each service, mobile carriers need to meet different service requirements for each service (for example, delay time, communication range, data rate, bandwidth, reliability, etc.). To this end, a mobile carrier may configure network slices and assign network resources appropriate for a particular service for each network slice or each set of network slices. Network resources may refer to a network function (NF) or assignment of logic resources provided by the NF or assignment of radio resources of a base station, and are not limited to the above examples.

For example, a mobile carrier may configure a network slice A to provide a mobile broadband service, configure a network slice B to provide a vehicle communication service, and configure a network slice C to provide an IoT service. That is, in a 5G network, corresponding services may be respectively provided on network slices specially designed according to the characteristics of the services. Single-Network Slice Selection Assistance Information (S-NSSAI) defined in the 3GPP may be used as an identifier for identifying a network slice.

A mobile carrier may operate a 5G network and an EPS (or Long-Term Evolution (LTE) or 4G) network together. A terminal may access a 5G network and move to an EPS network while using a service. Alternatively, the terminal may access the EPS network and move to the 5G network while using the service.

Figure 2:
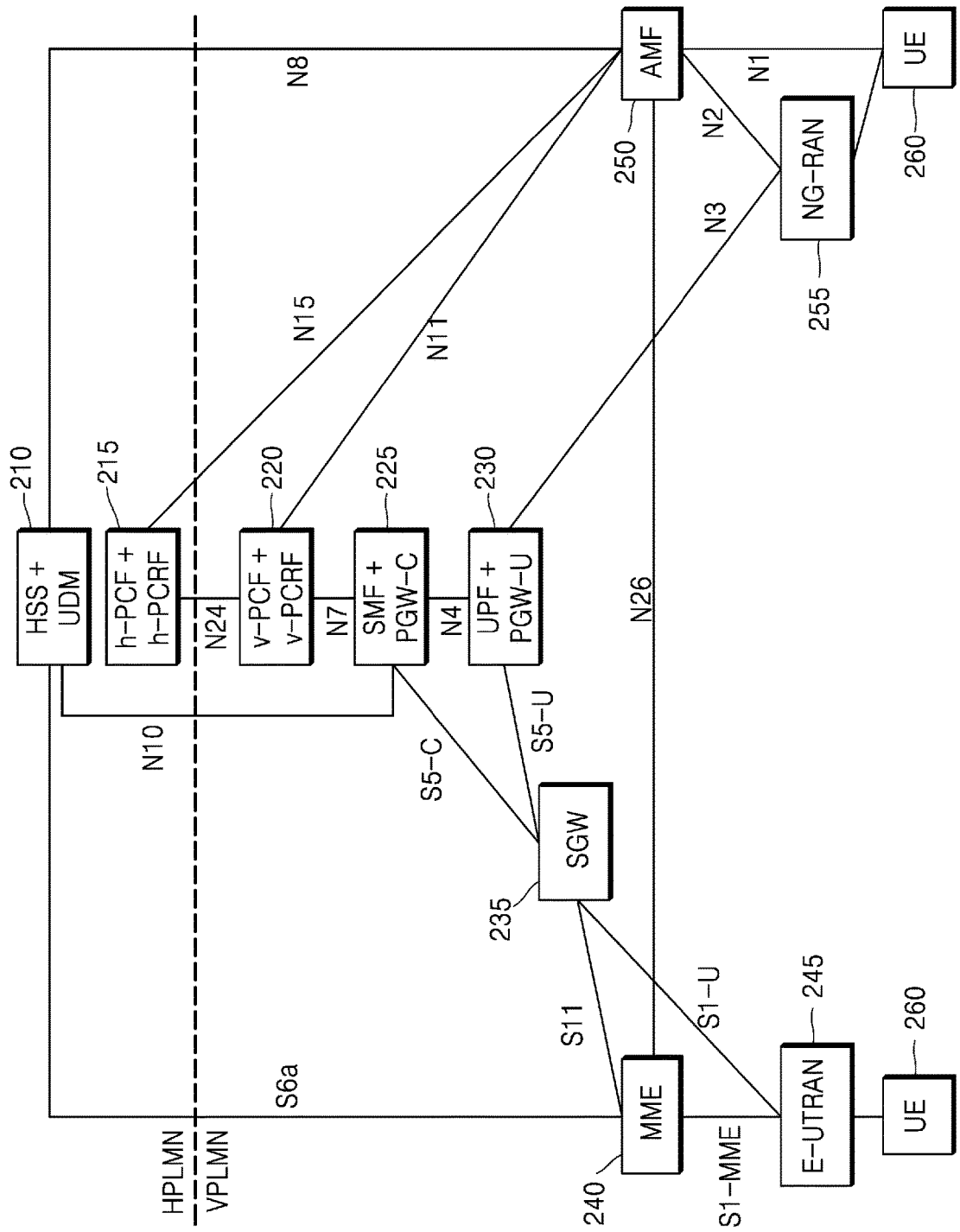
FIG. 2 is a diagram of an interworking scheme between a 5GS and an EPS under a local breakout roaming condition according to an embodiment of the disclosure.
Figure 3:
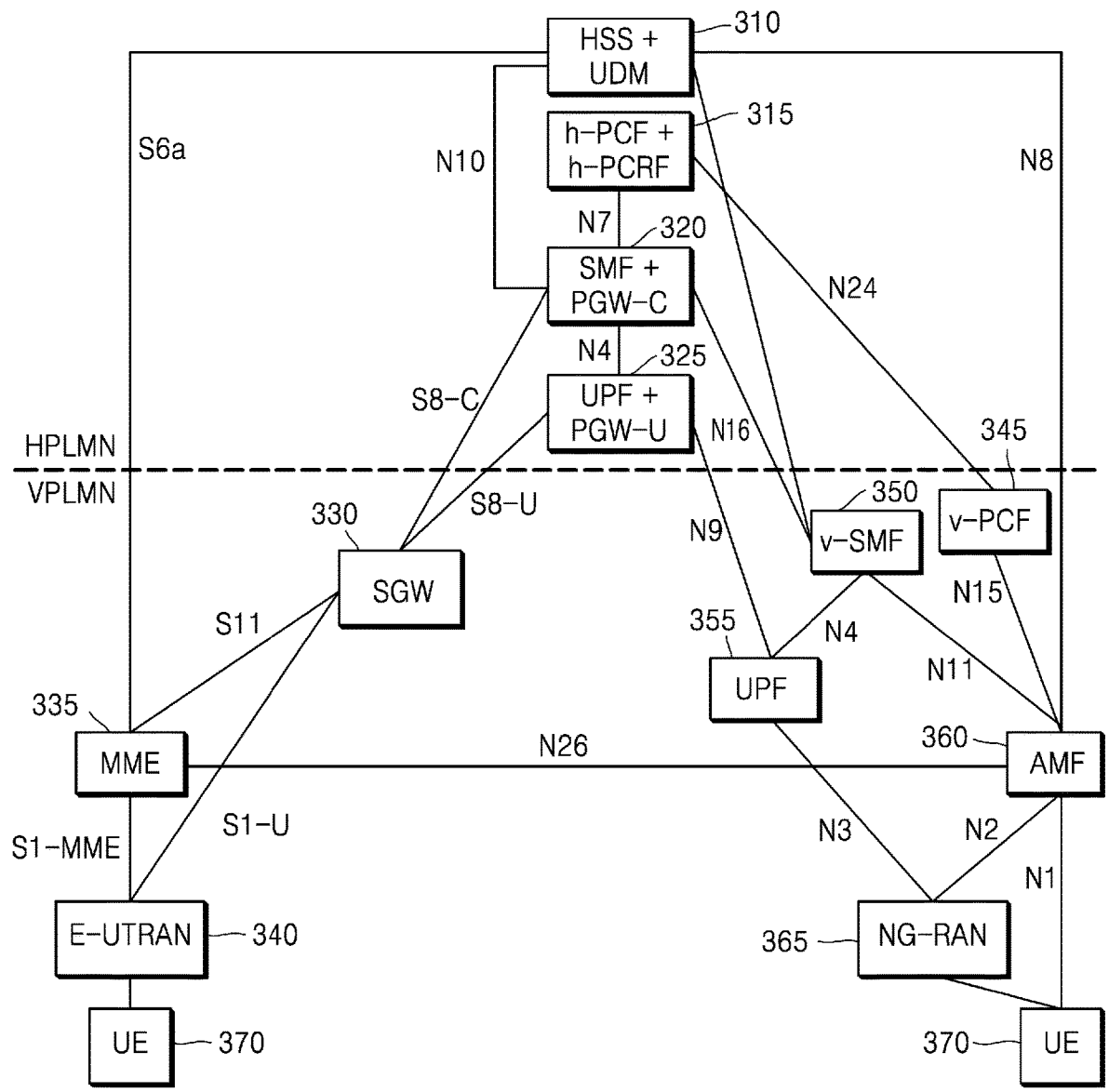
FIG. 3 is a diagram of an interworking scheme between a 5GS and an EPS under a home-routed roaming condition according to an embodiment of the disclosure.

In the disclosure, an interworking method between a 5G network system architecture providing a network slicing function and an EPS network system is defined. FIGS. 1, 2, and 3 below illustrate an interworking scheme of a 5G system (5GS) and an EPS.

In addition, in the disclosure, a network operation and a terminal operation are defined, in which a terminal using a communication service by establishing a session connection in the EPS may use a service seamlessly even when the terminal moves to the 5GS. According to an embodiment of the disclosure, the network function may indicate a network entity (hereinafter, interchangeably used with 'NE') or network resources. FIG. 1 is a diagram of an interworking scheme between a 5GS and an EPS under a non-roaming condition according to an embodiment of the disclosure. The 5GS may include a New Radio (NR) base station 150, an Access and Mobility Management Function (AMF) 145, a Session Management Function (SMF) 120, a User Plane Function (UPF) 125, a Policy Control Function (PCF) 115, and a Unified Data Management (UDM) 110.

Referring to FIG. 1, the AMF 145 may be a network function of managing access of a terminal to a wireless network and mobility of the terminal. Also, the SMF 120 may be a network function of managing packet data network connection provided to a terminal. Also, the UPF 125 may act as a gateway for transmitting packets transmitted or received by a terminal and may be controlled by the SMF 120. Also, the PCF 115 may be a network function of applying service policies, billing policies and policies regarding a protocol data unit (PDU) session by a mobile carrier with respect to a terminal. Also, the UDM 110 may be a network function of storing and managing information about subscribers. However, the configuration of the 5GS is not limited to the above example.

According to an embodiment of the disclosure, an EPS may include an Evolved Universal Terrestrial Radio Access (E-UTRA) base station 140, a Mobility Management Entity (MME) 135, a Serving Gateway (S-GW) 130, a PDN Gateway-user plane (PGW-U) 125, a PDN Gateway-control plane (PGW-C) 120, a Policy and Charging Function (PCRF) 115, and a Home Subscribe Server (HSS) 110.

According to an embodiment of the disclosure, the MME 135 may be a network function of authenticating a terminal 155, manages a session such as a bearer, and manages a connectivity state of the terminal 155. Also, according to an embodiment of the disclosure, the S-GW 130 may be a network function of forwarding data (or a data packet). Also, the PGW-C 120 and the PGW-U 125 may be network functions of providing connectivity between a terminal and a Packet Data Network (PDN) which is an external network (not shown). Also, the PCRF 115 may be a network function of determining a billing policy and a quality of service (QoS) policy to be applied to the terminal 155, and in some embodiments, the HSS 110 may be a network function including information for authentication of the terminal 155. The S1-MME, S6a, S11, S1-U, S-5C, S5-U, S-8C, and S8-U are interfaces for the E-UTRAN connectivity and the N1, N2, N3, N4, N8, N9, N10, N11, N15, N16, N24 and N26 are interfaces for the NG-RAN connectivity as shown in FIGS. 1 to 3. However, the configuration of the EPS is not limited to the above example.

Referring to FIG. 1, the UDM 110 of the 5GS and the HSS 110 of the EPS may be configured as one combo-node. The SMF 120 of the 5GS and the PGW-C 120 of the EPS may be configured as one combo-node. The UDM 110 of the 5GS and the HSS 110 of the EPS may be configured as one combo-node, and the node of the UDM+HSS 110 may store subscriber information of a terminal. The UPF 125 of the 5GS and the PGW-U 125 of the EPS may be configured as one combo-node. The terminal 155 may use an EPS network service by accessing the MME 135 of the EPS via the E-UTRA base station 140. Also, the terminal 155 may use a 5GS network service by accessing the AMF 145 of the 5GS via the NR base station 150. FIG. 2 is a diagram of an interworking scheme between a 5GS and an EPS under a local breakout roaming condition according to an embodiment of the disclosure. Referring to FIG. 2, with reference to FIG. 1, a terminal 260 may use an EPS network service by accessing an MME 240 of the EPS via an E-UTRA base station 245. Also, the terminal 260 may use a 5GS network service by accessing an AMF 250 of the 5GS via an NR base station 255. In an interworking scheme between a 5GS and an EPS in local breakout roaming, a node of a SMF+PGW-C 225 may be located in a Visited Public Land Mobile Network) (V-PLMN). Similar to FIG. 1, FIG. 2 shows SGW node 235, HSS+UDM combo node 210, h-PCF+h-PCRF combo node 215, v-PCF+v-PCRF combo node 220 and UPF+PGW-U combo node 230.

FIG. 3 is a diagram of an interworking scheme between a 5GS and an EPS under a home-routed-roaming condition according to an embodiment of the disclosure. Referring to FIG. 3, as described with reference to FIG. 1, a terminal 370 may use an EPS network service by accessing an MME 335 of the EPS via an E-UTRA base station 340. Also, the terminal 370 may use a 5GS network service by accessing an AMF 360 of the 5GS via an NR base station 365. In an interworking scheme between a 5GS and an EPS in home-routed roaming, a node of a SMF+PGW-C 320 may be located in a home PLMN. Similar to FIGS. 1 and 2, FIG. 3 shows SGW node 330, HSS+UDM combo node 310, h-PCF+h-PCRF combo node 315, v-PCF node 345, v-SMF node 350 and UPF+PGW-U combo node.

Embodiment 1

Figure 4:
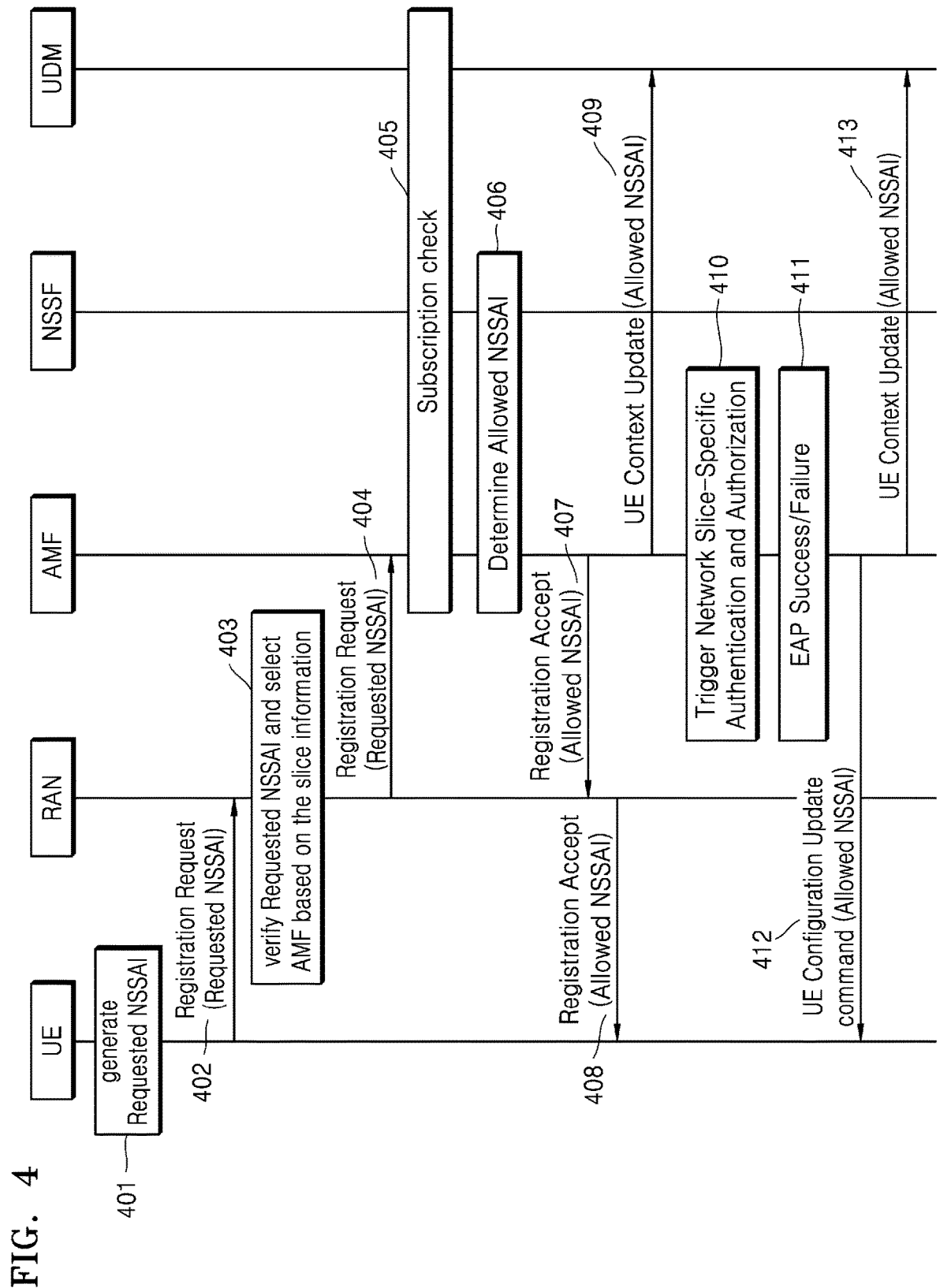
FIG. 4 illustrates a network slice-specific authentication and authorization procedure in a terminal registration procedure according to an embodiment of the disclosure.

FIG. 4 illustrates a network slice-specific authentication and authorization (NSSAA) procedure in a terminal registration procedure according to an embodiment of the disclosure. That is, FIG. 4 illustrates a method of performing a NSSAA procedure in a terminal registration procedure. An AMF may store related information according to a result (success or failure) of NSSAA regarding S-NSSAI, in a UDM.

Referring to FIG. 4, in operation 401, a UE may generate a Registration Request message. Requested NSSAI that the UE is to use may be included in the Registration Request message. According to an embodiment of the disclosure, Requested NSSAI may include one or more S-NSSAIs. For example, Requested NSSAI may include S-NSSAI A and S-NSSAI B.

According to an embodiment of the disclosure, the UE may transmit a Registration Request message to the AMF via a base station (also referred to as RAN). In operation 402, the base station may receive the Registration Request message transmitted by the UE. However, the name of the message is not limited to the above example.

In operation 403, the base station authenticates the received Registration Request message, and may select an AMF based on a UE ID (such as 5G-GUTI), Requested NSSAI, and the like.

In operation 404, the base station may transmit the Registration Request message to the selected AMF.

In operation 405, the AMF may obtain UE subscription data from the UDM to process the Registration Request message. According to an embodiment of the disclosure, the UE subscription data may include at least one of subscribed slices (Subscribed S-NSSAIs) of the UE or information indicating whether a subscribed slice is subject to NSSAA (The Subscribed S-NSSAIs marked as subject to Network Slice-Specific Authentication and Authorization). For example, the subscription of the UE may include S-NSSAI A and S-NSSAI B, and S-NSSAI A may be subject to NSSAA.

In operation 406, the AMF may determine Allowed NSSAI based on the UE subscription data received from the UDM in operation 405. According to an embodiment of the disclosure, the Allowed NSSAI may include one or more S-NSSAIs available for the UE. For example, when S-NSSAI A and S-NSSAI B are included in Requested NSSAI requested by the UE, and both S-NSSAI A and S-NSSAI B are included in a subscribed slice, both S-NSSAI A and S-NSSAI B requested by the UE may be used. However, as S-NSSAI A is subject to NSSAA, the AMF may determine to include only S-NSSAI B in the Allowed NSSAI.

In operation 407, the AMF may transmit a Registration Accept message to the UE. The Registration Accept message may include the Allowed NSSAI determined in operation 406. In addition, the Registration Accept message may include information indicating that S-NSSAI A is undergoing an NSSAA procedure (e.g., an indication, an indicator or a cause value). The Registration Accept message transmitted by the AMF may be transmitted to the UE through the base station. However, the name of the message is not limited to the above example.

In operation 408, the base station may transmit the Registration Accept message to the UE. The UE may use S-NSSAI B included in the Allowed NSSAI included in the Registration Accept message. In addition, the UE may be aware that the S-NSSAI A requested in operation 402 is undergoing an NSSAA procedure.

In operation 409, the AMF may store a UE context in the UDM. A UE Context Update message transmitted by the AMF to the UDM may be a Nudm_UECM_Registration message or a Nudm_UECM_Update message. However, the name of the message is not limited to the above example. The UE Context Update message may include the Allowed NSSAI of the UE determined by the AMF in operation 406. In addition, the UE Context Update message may include information indicating that S-NSSAI A is undergoing an NSSAA procedure. The UDM may store, as a UE context, allowed NSSAI and S-NSSAI information undergoing NSSAA. For example, in the UDM, a UE context in which the allowed NSSAI is S-NSSAI B and the S-NSSAI undergoing NSSAA is S-NSSAI A may be stored.

In operation 410, the AMF may start a NSSAA procedure for S-NSSAI A.

According to an embodiment of the disclosure, operation 409 may be performed after operation 406. The AMF may perform operation 409 before operation 407.

In operation 411, the NSSAA procedure for S-NSSAI A, started in operation 409, is completed. When the NSSAA for S-NSSAI A succeeds (Extensible Authentication Protocol (EAP) Success), the AMF may add S-NSSAI A to the Allowed NSSAI.

In operation 412, when the NSSAA for S-NSSAI A is successful, the AMF may transmit a new Allowed NSSAI to the UE. The message of operation 412 may be a UE Configuration Update command message. However, the name of the message is not limited to the above example. In the new Allowed NSSAI, S-NSSAI A, for which NSSAA has succeeded, may be added together with S-NSSAI B that was previously included in the previous Allowed NSSAI. The UE may use S-NSSAI A and S-NSSAI B included in the Allowed NSSAI.

When the NSSAA for S-NSSAI A fails (EAP Failure), the AMF may include information indicating that the NSSAA for S-NSSAI A has failed (e.g., an indication, an indicator or a cause value, etc.) in the message of operation 412 and transmit the message to the UE. The message of operation 412 may be a UE Configuration Update command message. However, the name of the message is not limited to the above example. The UE continues to use S-NSSAI B included in the Allowed NSSAI received in operation 408, and may be aware that S-NSSAI A is not available.

In operation 413, the AMF may store a UE context in the UDM. The UE Context Update message transmitted by the AMF to the UDM may be a Nudm_UECM_Registration message or a Nudm_UECM_Update message. However, the name of the message is not limited to the above example.

The UE Context Update message may include information according to a result of the NSSAA (success or failure) of operation 411.

For example, when the NSSAA for S-NSSAI A has succeeded, and S-NSSAI A and S-NSSAI B are included in the Allowed NSSAI, the message transmitted by the AMF to the UDM in operation 413 may contain new Allowed NSSAI. In addition, the message transmitted by the AMF to the UDM in operation 413 may include information indicating that the NSSAA for S-NSSAI A was successful (e.g., an indicator indicating that the NSSAA for S-NSSAI A was successful). In addition, the message of operation 413 may include a valid time of the success of the NSSAA for S-NSSAI A. The UDM may store the information received from the AMF.

Alternatively, for example, when NSSAA for S-NSSAI A has failed, information indicating that NSSAA for S-NSSAI A has failed (for example, an indicator indicating that NSSAA for S-NSSAI A has failed) may be included in the message transmitted by the AMF to the UDM in operation 413. The UDM may store the information received from the AMF.

Embodiment 2

Figure 5:
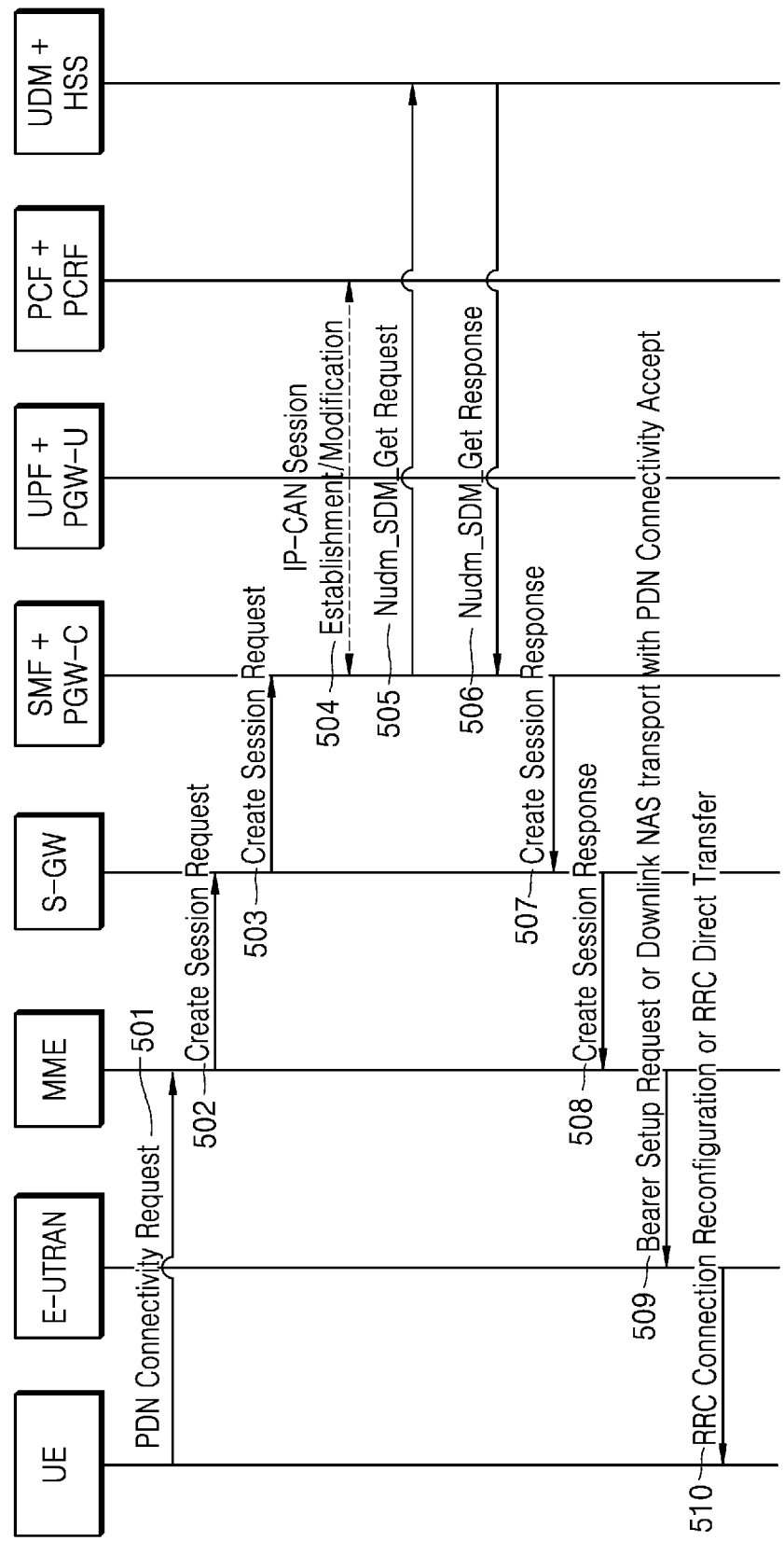
FIG. 5 illustrates a procedure of determining Single-Network Slice Selection Assistance Information (S-NSSAI) for a packet data network (PDN) connection according to an embodiment of the disclosure.

FIG. 5 illustrates a procedure of determining S-NSSAI for a PDN connectivity according to an embodiment of the disclosure. Referring to FIG. 5, when a terminal is connected to an evolved packet core (EPC) to request a PDN connectivity, a SMF+PGW-C may determine S-NSSAI for the PDN connectivity according to information received from a UDM+HSS.

In operation 501, the terminal may transmit a PDN connectivity request to a MME to establish a PDN connectivity. The PDN connectivity request message may include access point name (APN) information requested by the terminal. The PDN connectivity request message may be transmitted to the MME via an E-UTRA base station. The name of the message is not limited to the above example.

In operation 502, the MME that has received the PDN connectivity request message in operation 501 may transmit a create session request to an S-GW. The name of the message is not limited to the above example.

In operation 503, the S-GW that has received a create session request message in operation 502 may transmit the create session request message to the SMF+PGW-C. The name of the message is not limited to the above example.

In operation 504, the SMF+PGW-C that has received the create session request message in operation 503 may perform an Internet Protocol (IP)-Connectivity Access Network (CAN) session setup or correction procedure with a PCF+PCRF.

In operation 505, the SMF+PGW-C that has received the create session request message in operation 503 may transmit a Nudm_SDM_Get request message to the UDM+HSS. According to an embodiment of the disclosure, the Nudm_SDM_Get request message may include a data type of requested subscriber information and key information via which the data type of the subscriber information is accessible. According to an embodiment of the disclosure, key information via which a data type of subscriber information is accessible may be included in "Subscription Permanent Identifier (SUPI)" which is a terminal ID. Also, the name of the message is not limited to the above example.

In operation 506, the UDM+HSS that has received the Nudm_SDM_Get request message in operation 505 may transmit UE subscription data of a terminal corresponding to the SUPI, to the SMF+PGW-C. The name of the message is not limited to the above example.

For example, when subscribed slices (Subscribed S-NSSAIs) is included in the UE subscription data, the SMF+PGW-C may select S-NSSAI that is supportable by the SMF+PGW-C from among subscribed S-NSSAIs.

For example, when subscribed slices and an APN list (or DNN list) that is supportable by each subscribed slice are included in UE subscription data, the SMF+PGW-C may select S-NSSAI supportable by the SMF+PGW-C from among subscribed S-NSSAIs supporting an APN requested by the terminal.

For example, when subscribed slices and information indicating whether the subscribed slice is subject to NSSAA (The Subscribed S-NSSAIs marked as subject to Network Slice-Specific Authentication and Authorization) are included in UE subscription data, the SMF+PGW-C may select S-NSSAI supportable by the SMF+PGW-C from among S-NSSAIs that are not subject to NSSAA from among subscribed slices. This may be to prevent S-NSSAI that is subject to NSSAA from being selected, because a NSSAA procedure is not supported in an EPC.

For example, when a subscribed slice and information indicating whether the subscribed slice is subject to NSSAA (The Subscribed S-NSSAIs marked as subject to Network Slice-Specific Authentication and Authorization) are included in UE subscription data, the SMF+PGW-C may select S-NSSAI supportable by the SMF+PGW-C from among subscribed slices. When S-NSSAI selected by the SMF+PGW-C is subject to NSSAA, the SMF+PGW-C may include an indicator indicating that the S-NSSAI is subject to NSSAA, in a Create Session response message to be transmitted to the S-GW in operation 507 and transmit the Create Session response message. The indicator indicating that the S-NSSAI is subject to NSSAA may be transmitted to the terminal by passing operation 508, operation 509, and operation 510. The name of the message is not limited to the above example. This may be to allow, when S-NSSAI subject to NSSAA is selected, the terminal to move to a $5^{th}$ Generation Core (5GC) and perform an NSSAA procedure, because a NSSAA procedure is not supported in an EPC.

For example, when subscribed slices, an APN list supportable by each subscribed slice, and information indicating whether a subscribed slice is subject to NSSAA (The Subscribed S-NSSAIs marked as subject to Network Slice-Specific Authentication and Authorization) are included in UE subscription data, the SMF+PGW-C may select S-NSSAI supportable by the SMF+PGW-C from among S-NSSAI that are not subject to NSSAA from among subscribed S-NSSAIs supporting an APN requested by the terminal.

For example, when subscribed slices and NSSAA result information (for example, an indicator indicating that NSSAA for S-NSSAI has succeeded, a valid time of a success of NSSAA for S-NSSAI, an indicator indicating that NSSAA for S-NSSAI has failed, or the like) are included in UE subscription data, the SMF+PGW-C may select S-NSSAI supportable by the SMF+PGW-C from among the rest of subscribed slices except for the S-NSSAI, for which NSSAA has failed, from among the subscribed slices. This may be to allow to select S-NSSAI, for which NSSAA has succeeded in the 5GC, from among S-NSSAI not subject to NSSAA or S-NSSAI subject to NSSAA, because a NSSAA procedure is not supported in an EPC.

For example, when Allowed NSSAI is included in UE subscription data, the SMF+PGW-C may select S-NSSAI supportable by the SMF+PGW-C from among the Allowed NSSAI. This may be to allow to select S-NSSAI that is approved to use in the 5GC, because a NSSAA procedure or a method of determining Allowed NSSAI is not supported in an EPC.

When the S-NSSAI selected by the SMF+PGW-C is S-NSSAI subject to NSSAA, the SMF+PGW-C may transmit an indicator indicating that S-NSSAI related to PDN connectivity (PDU session) is subject to NSSAA to the UDM+HSS. The UDM+HSS may store a PDN connectivity (PDU session) context received from the SMF+PGW-C. That is, by using the PDN connectivity (PDU session) context, the UDM+HSS may store the S-NSSAI selected by the SMF+PGW-C and an indicator indicating that the selected S-NSSAI is subject to NSSAA.

When there is no S-NSSAI selectable by the SMF+PGW-C, the SMF+PGW-C may select a default slice (default S-NSSAI) or no S-NSSAI at all.

When the SMF+PGW-C has selected no S-NSSAI at all, the SMF+PGW-C may reject the request for PDN connectivity requested in operation 503. A PDN connectivity rejection message may be transmitted to the terminal by passing operation 507, operation 508, operation 509, and operation 510. Accordingly, the terminal may not establish a PDN connectivity. The name of the message is not limited to the above example.

Alternatively, when the SMF+PGW-C has selected no S-NSSAI at all, the SMF+PGW-C may accept a PDN connectivity without S-NSSAI. A PDN connectivity acceptance message may be transmitted to the terminal by passing operation 507, operation 508, operation 509, and operation 510. The PDN connectivity acceptance message may not include S-NSSAI.

In operation 507, the SMF+PGW-C may transmit a Create Session response message to the S-GW. In the Create Session response message, the S-NSSAI selected by the SMF+PGW-C in operation 506 may be included in the form of a protocol configuration option (PCO). Alternatively, when the SMF+PGW-C selected no S-NSSAI in operation 506, no S-NSSAI may be included in the Create Session response message. The name of the message is not limited to the above example.

In operation 508, the S-GW may transmit the Create session response message to the MME. The Create session response message may include slice information (S-NSSAI) received in operation 507.

In operation 509, the MME may transmit a Bearer Setup request message or a "Downlink NAS transport with PDN Connectivity Accept" message to the E-UTRA base station. The Bearer Setup request message or the "Downlink NAS transport with PDN Connectivity Accept" message transmitted by the MME to the E-UTRA base station may include slice information (S-NSSAI) included in the Create Session response message received in operation 508. The name of the message is not limited to the above example.

In operation 510, the E-UTRA base station may transmit, to the terminal, an RRC connection reconfiguration message or an RRC Direct Transfer message. The RRC connection reconfiguration message or the RRC Direct Transfer message may include slice information (S-NSSAI) included in the message received in operation 509. The name of the message is not limited to the above example.

The terminal that has received the RRC connection reconfiguration message or the RRC Direct Transfer message may store the S-NSSAI, which is the slice information included in the RRC connection reconfiguration message or the RRC Direct Transfer message, and an PLMN ID using that S-NSSAI. The slice information may be included in a message in the form of PCO.

Embodiment 3

According to an embodiment of the disclosure, as described with respect to Embodiment 2, a terminal may access an EPC to establish a PDN connectivity, and may receive S-NSSAI information related to the PDN connectivity from the SMF+PGW-C.

The terminal may move from an EPC network to a 5GC network, and here, the terminal may provide information related to the PDN connectivity established on the EPC network, to the 5GC network.

When the terminal has received, in addition to S-NSSAI in Embodiment 2, an indicator indicating that S-NSSAI is subject to NSSAA, the terminal may move to the 5GC and include, in a Registration Request message to be transmitted to the AMF, at least one of the S-NSSAI received in Embodiment 2 or the indicator indicating that the S-NSSAI is subject to NSSAA, and transmit the Registration Request message.

Also, according to an embodiment of the disclosure, the terminal may include information about credentials for NSSAA related to S-NSSAI stored in the terminal (association between the S-NSSAI and corresponding credentials for the Network Slice-Specific Authentication and Authorization), in the Registration Request message, and transmit the same to the AMF.

Also, according to an embodiment of the disclosure, the terminal may include, in another message than the Registration Request message, credential information for NSSAA related to S-NSSAI, and transmit the same to the AMF.

When the terminal receives no S-NSSAI in Embodiment 2, the terminal may move to the 5GC and include, in a Registration Request message to be transmitted to the AMF, at least one of a PDU Session ID related to the PDN connectivity established in the procedure of Embodiment 2, an indicator indicating that there is no S-NSSAI associated with the PDU Session, or an indicator indicating S-NSSAI associated with PDU session, as empty, and an indicator indicating that PDU Session is subject to NSSAA.

According to an embodiment of the disclosure, the AMF that has received the Registration Request message may trigger an NSSAA procedure for S-NSSAI.

For example, when EAP-related information is not included in a UE context received from the MME during a registration procedure, the AMF may trigger an NSSAA procedure for S-NSSAI.

For example, when the Registration Request message received from the terminal during the registration procedure includes an indicator indicating that S-NSSAI is subject to NSSAA or credential information for S-NSSAI, the AMF may trigger an NSSAA for S-NSSAI.

For example, when information received from the UDM during the registration procedure includes, as a PDN connectivity (PDU session) context, information indicating that S-NSSAI is subject to NSSAA, the AMF may trigger an NSSAA procedure for S-NSSAI.

Figure 6:
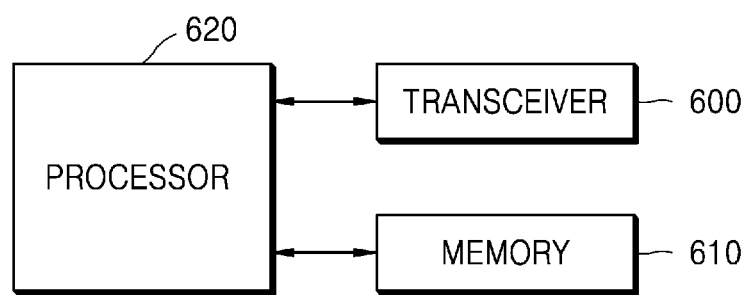
FIG. 6 illustrates a configuration of a terminal according to an embodiment of the disclosure.

FIG. 6 illustrates a configuration of a terminal according to an embodiment of the disclosure.

The terminal according to an embodiment of the disclosure may include a processor 620 controlling overall operations of the terminal, a transceiver 600 including a transmitter and a receiver, and a memory 610. However, the terminal is not limited to the above example, and may include more or fewer components than those illustrated in FIG. 6.

Referring to FIG. 6, the transceiver 600 may transmit or receive a signal to or from network entities or other terminals. A signal transmitted to or from a network entity may include control information and data. In addition, the transceiver 600 may receive a signal via a radio channel and output the same to the processor 620, and transmit the signal output from the processor 620, via the radio channel.

Referring to FIG. 6, the processor 620 may control the terminal such that the terminal performs an operation of one of the above-described embodiments. The processor 620, the memory 610, and the transceiver 600 are not necessarily to be implemented as separate modules but may also be implemented as a single component, for example, in the form of a single chip. Also, the processor 620 and the transceiver 600 may be electrically connected to each other. Also, the processor 620 may be an application processor (AP), a communicator processor (CP), a circuit, an application-specific circuit, or at least one processor.

According to an embodiment of the disclosure, the memory 610 may store data such as a basic program for operation of a terminal, an application program, setup information, or the like. In particular, the memory 610 provides stored data according to a request from the processor 620. The memory 610 may be configured in a storage medium, such as read-only memory (ROM), random access memory (RAM), a hard disk, compact disc-ROM (CD-ROM), or digital versatile disc (DVD), or a combination thereof. Also, the memory 610 may be included by a plural number. Also, the processor 620 may execute the above-described embodiments based on a program stored in the memory 610, the program being designed to perform the above-described embodiments of the disclosure.

Figure 7:
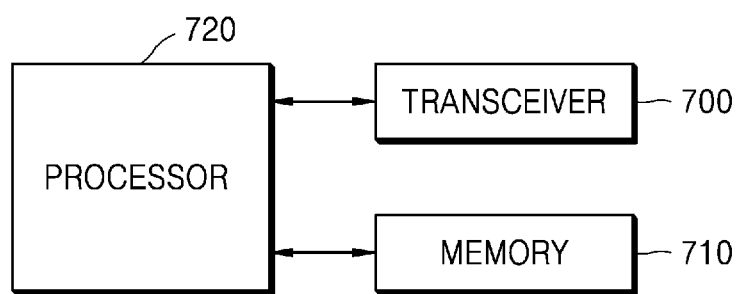
FIG. 7 illustrates a configuration of a network entity according to an embodiment of the disclosure.

FIG. 7 illustrates a configuration of a network entity according to an embodiment of the disclosure.

The network entity according to an embodiment of the disclosure may include a processor 720 controlling overall operations of the network entity, a transceiver 700 including a transmitter and a receiver, and a memory 710. However, the network entity is not limited to the above example, and may include more or fewer components than those illustrated in FIG. 7.

Referring to FIG. 7, the transceiver 700 may transmit or receive a signal to or from other network entities or at least one of terminals. The signal transmitted or received to or from the other network entities or at least one of the terminals may include control information and data.

According to an embodiment of the disclosure, the processor 720 may control a network entity such that the network entity performs an operation of one of the above-described embodiments. The processor 720, the memory 710, and the transceiver 700 are not necessarily to be implemented as separate modules but may also be implemented as a single component, for example, in the form of a single chip. Also, the processor 720 and the transceiver 700 may be electrically connected to each other. Also, the processor 720 may be an AP, a CP, a circuit, an application-specific circuit, or at least one processor.

According to an embodiment of the disclosure, the memory 710 may store data such as a basic program for operation of a network entity, an application program, setup information, or the like. In particular, the memory 710 provides stored data according to a request from the processor 720. The memory 710 may be configured in a storage medium, such as ROM, RAM, a hard disk, CD-ROM, or DVD, or a combination thereof. Also, the memory 710 may be included by a plural number. Also, the processor 720 may execute the above-described embodiments based on a program stored in the memory 710, the program being designed to perform the above-described embodiments of the disclosure.

It should be noted that the above-described structural diagram, a diagram of a method of transmitting a control/data signal, a diagram of an operation procedure, and structural diagrams are not intended to limit the scope of the disclosure. That is, all components, entities, or steps of operation described in the embodiments of the disclosure should not be interpreted as being essential components for the implementation of the disclosure, and the disclosure may be implemented within the scope that does not impair the essence of the disclosure, by including only some components. Also, the embodiments of the disclosure may be combined with each other as required. For example, portions of the methods according to the disclosure may be combined with each other to enable a network entity and a terminal to operate.

The operations of the base station or the terminal described above may be implemented by including a memory device storing relevant program codes, in an arbitrary element in the base station or the terminal device. That is, a controller of the base station or the terminal device may execute the above-described operations by reading the program codes stored in the memory device by using a processor or a central processing unit (CPU) and execute the same.

Various components and modules of an entity, a base station, or a terminal device described herein may also be operated using a hardware circuit, for example, a complementary metal oxide semiconductor-based logic circuit, firmware, or a combination of software and/or hardware or a combination of firmware and/or software embedded in a machine-readable medium. As an example, various electrical structures and methods may be implemented using transistors, logic gates, and electrical circuits such as application-specific semiconductors.

When implemented as software, a computer-readable storage medium storing one or more programs (e.g., software modules) may be provided. The one or more programs stored in the computer-readable storage medium are configured to be executable by one or more processors in an electronic device. The one or more programs include instructions causing the electronic device to execute the methods according to embodiments of the disclosure as described the specification or in the following claims.

The programs (e.g., software modules or software) may be stored in RAM, non-volatile memory including flash memory, ROM, electrically erasable programmable read-only memory (EEPROM), a magnetic disc storage device, CD-ROM, a DVD, another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus performing the embodiments of the disclosure. Another storage device on the communication network may also be connected to the apparatus performing the embodiments of the disclosure.

According to the apparatus and method of the various embodiments of the disclosure, a method of interworking between a 5G network system architecture providing a network slicing function and an EPS network system is provided, thereby efficiently providing a service in a mobile communication system.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

In other words, it is obvious to those skilled in the art that other modifications based on the technical spirit of the disclosure can be implemented. Also, the embodiments of the disclosure may be combined with each other as required. For example, portions of the methods proposed in the disclosure may be combined with each other to enable a base station and a terminal to operate. Although the embodiments of the disclosure have been described based on 5G and the NR system, modified examples based on the technical spirit of the embodiments may also be carried out in other systems such as LTE, LTE-A, LTE-A-Pro systems, etc.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method of selecting, by a control entity, a network slice, the method comprising:
receiving a create session request message from a serving gateway (S-GW);
transmitting, to a storage entity, a request message for subscription data corresponding to identification information of a terminal;
receiving, from the storage entity, the subscription data including information indicating whether a subscribed network slice is subject to network slice-specific authentication and authorization (NSSAA);
selecting, from among subscribed network slices, a network slice that is not subject to NSSAA and is supportable by the control entity; and
transmitting a create session response message including information of the selected network slice,
wherein the create session request message is received based on a packet data network (PDN) connectivity request message transmitted from the terminal.

2. The method of claim 1,
wherein the PDN connectivity request message comprises information of an access point name (APN) requested from the terminal, and
wherein the selecting comprises selecting, from among subscribed network slices of the terminal, a network slice that is not subject to NSSAA, supports the APN, and is supportable by the control entity.

3. The method of claim 1, wherein, when there is no network slice selectable by the control entity, the PDN connectivity request is rejected.

4. The method of claim 3, wherein a case where there is no network slice selectable by the control entity comprises a case where network slices that are supportable by the control entity from among subscribed network slices of the terminal are all subject to NSSAA.

5. The method of claim 1, wherein the control entity is a combo-node of a session management function (SMF) and a PDN gateway control (PGW-C), and the storage entity is a combo-node of a home subscriber server (HSS) and a unified data management (UDM).

6. The method of claim 1, wherein the create session response message further includes a public land mobile network (PLMN) ID corresponding to the selected network slice.

7. A control entity for selecting a network slice, the control entity comprising:
a transceiver; and
a processor coupled with the transceiver and configured to:
receive a create session request message from a serving gateway (S-GW),
transmit, to a storage entity, a request message for subscription data corresponding to identification information of a terminal,
receive, from the storage entity, the subscription data including information indicating whether a subscribed network slice is subject to network slice-specific authentication and authorization (NSSAA),
select, from among subscribed network slices, a network slice that is not subject to NSSAA and is supportable by the control entity, and
transmit a create session response message including information of the selected network slice,
wherein the create session request message is received based on a packet data network (PDN) connectivity request message transmitted from the terminal.

8. The control entity of claim 7,
wherein the PDN connectivity request message comprises information of an access point name (APN) requested from the terminal, and
wherein the processor is further configured to select, from among subscribed network slices of the terminal, a network slice that is not subject to NSSAA, supports the APN, and is supportable by the control entity.

9. The control entity of claim 7, wherein the processor is further configured to reject the PDN connectivity request when there is no network slice selectable by the control entity.

10. The control entity of claim 9, wherein a case where there is no network slice selectable by the control entity comprises a case where network slices that are supportable by the control entity from among subscribed network slices of the terminal are all subject to NSSAA.

11. The control entity of claim 7, wherein the control entity is a combo-node of a session management function (SMF) and a PDN gateway control (PGW-C), and the storage entity is a combo-node of a home subscriber server (HSS) and a unified data management (UDM).

* * * * *